3,849,352
FLAME RETARDANT POLYOLEFIN COMPOSI-
TIONS OF IMPROVED COLOR AND MELT
STABILITY
Jerry O. Reed, Mauldin, and James S. Dix, Greenville,
S.C., assignors to Phillips Petroleum Company
No Drawing. Filed May 30, 1972, Ser. No. 257,829
Int. Cl. C08f 19/04, 21/04
U.S. Cl. 260—23 H                     5 Claims

ABSTRACT OF THE DISCLOSURE

Flame retardant polyolefin compositions having improved color and melt stability are obtained by the addition of a solid metal soap mixture to said compositions.

---

This invention relates to flame retardant polyolefin compositions and methods for the preparation thereof.

Flame retardant polyolefin compositions are highly desirable raw materials for the manufacture of various compression and injection molded items such as plastic pipe, rods, sheets, films and the like. In the manufacture of flame retardant polyolefin compositions generally it has been found that said compositions exhibit undesirable color and melt degradation at temperatures commonly employed in molding and extruding said compositions into finished articles of manufacture. Although additives are known which can be added to flame retardant polyolefin compositions, the prior art has not taught the improved color and melt stability of flame retardant polyolefin compositions which employ the stabilizing additives of this invention.

It is an object of this invention to provide flame retardant polyolefin compositions that exhibit improved melt flow processing characteristics. Still another object is to provide flame retardant polyolefin compositions of improved color stability. Still further it is an object to provide both melt and color stable flame retardant polyolefin compositions. Other objects of this invention will be apparent from the written description and the appended claims.

According to this invention, flame retardant polyolefin compositions are stabilized against undesirable color and melt degradation by the addition of a solid metal soap mixture to said compositions.

The polyolefins that can be employed in the practice of this invention are homopolymers and copolymers derived from the polymerization of 1-monoolefins having from 2 to 8 carbon atoms. In most instances, the preferred polyolefins are homopolymers of ethylene or propylene, copolymers of ethylene with minor amounts of other monomers copolymerizable therewith such as propylene, butene-1, hexene-1, octene-1 and the like, or copolymers of propylene with minor amounts of other monomers copolymerizable therewith such as ethylene, butene-1, hexene-1, octene-1, and the like. Polyolefins wherein at least 50 mol percent of the polyolefin is derived from the polymerization of ethylene or propylene monomeric units are presently preferred. Even more preferred are polyolefins wherein at least 90 mol percent of the polyolefin is derived from the polymerization of ethylene or propylene monomeric units. Still even more preferred because of their commercial importance are propylene polymers wherein at least 90 mol percent of the polyolefin is derived from the polymerization of propylene and from about 0.5 to 10 mol percent of the polyolefin is derived from the polymerization of a comonomer selected from ethylene or butene-1.

The flame retardant additives that can be employed in the practice of this invention are halogenated organic compounds, preferably halogenated ethers. Preferred halogenated ethers include acyclic and cyclic hydrocarbyl ethers which contain from 8 to 22 carbon atoms and can be represented by the following general formula:

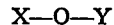

wherein X and Y individually represent acyclic and cyclic hydrocarbyl radicals at least one of which is partially halogenated. Preferably the hydrocarbyl radicals are selected from aliphatic, cycloaliphatic, and aromatic radicals or combinations thereof. Particularly preferred halogenated ethers are mixed alkyl aryl ethers wherein the aryl hydrocarbon group contains from 6 to 15 carbon atoms and the alkyl group contains from 3 to 12 carbon atoms. Representative halogenated mixed alkyl aryl ethers include 2,3-dibromopropyl 2,4,6-tribromophenyl ether, 11,12-dibromododecyl 2,6-dibromo-4-n-octylphenyl ether, 2,4,6-tribromophenyl benzyl ether, 3,4-dibromobutyl phenyl ether, 2,4,6-tribromophenyl cyclohexyl ether, 2,2-bis[4-(2,3 - dibromopropoxy)phenyl]propane, 2,2-bis[4-(2,3-dbromopropoxy)3,5 - dibromophenyl]propane, and mixtures thereof.

Metal oxides can be employed in conjunction with halogenated organic compounds to improve the efficacy of the flame retardant additives. Representative metal oxides include arsenic trioxide, antimony trioxide and bismuth trioxide. Antimony oxide, preferably as the trioxide, is preferably employed with the halogenated ether.

The solid metal soap mixtures employed in the practice of this invention comprise a mixture of a polyvalent metal soap and a polyvalent metal phenolate. The polyvalent metal soaps can be represented by the formula

wherein each R is a cyclic or acyclic hydrocarbyl radical, individually each R radical contains from 2 to 22 carbon atoms, and M is selected from the polyvalent metals barium, cadmium, calcium, lead, strontium, tin and zinc. Presently preferred are polyvalent metal soaps wherein M is barium, cadmium or zinc, and mixtures thereof. The polyvalent metal phenolates can be represented by the formula M(OR′)$_2$, wherein each R′ is an aryl or alkaryl hydrocarbyl radical, individually each R′ radical contains from 4 to 18 carbon atoms, and M is the same as represented hereinbefore.

The improved flame retardant polyolefin compositions of this invention comprise any composition containing a polyolefin, a halogenated organic compound, a metal oxide and a solid metal soap mixture. Generally preferred compositions contain on a weight basis per 100 parts of polyolefin at least 0.1 part, more preferably from 0.1 to 2.5 parts, of a solid metal soap mixture; at least 1 part, more preferably from 1 to 20 parts, of halogenated organic compound; at least 0.5 part, more preferably from 0.5 to 10 parts of metal oxide. More preferred compositions contain from 0.2 to 1.5 parts of solid metal soap mixture; from 1.5 to 5 parts of halogenated organic compound; and from 0.75 to 2.5 parts of metal oxide.

In the preparation of the flame retardant polyolefin compositions of this invention, the solid metal soap mixtures can be combined with a halogenated organic compound and a polyolefin by means of any suitable process, providing the process intimately admixes all of the ingredients of the compositions. Suitable processes include dry blending of the ingredients of the compositions in subdivided form and subsequently masticating the resulting admixture at polyolefin melt temperatures for a period of time sufficient to form a homogeneous polyolefin composite.

In addition to the polyolefin, halogenated organic compound, and solid metal soap mixture, the improved flame retardant polyolefin compositions can contain other ingredients which aid in maintaining or improving the process or chemical stability of the polyolefin compositions. Representative of the generally useful ingredients are the following: polyhydric alcohols such as pentaerythritol, dipentaerythritol, glycerol, sorbitol, mannitol, methyl glucoside, trimethylolpropane and the like; inorganic auxiliary metal stabilizers such as cadmium phosphite, zinc chloride and zinc oxide, ultraviolet light stabilizing additives and antioxidants conventionally employed by the art with flame retardant polyolefin compositions.

The terms solid or liquid as employed in this application in the description of metal soap mixtures define the form of said mixtures at room temperatures.

Set out hereinafter are examples which illustrate this invention. Included are examples of the best mode of practicing the invention, which accordingly are not to be considered as unduly limitative.

EXAMPLE I

Various flame retardant polyolefin compositions were prepared from solid and liquid metal soap mixtures. A flame retardant composition which did not contain any metal soap mixture was also prepared for control purposes. The compositions were separately dry blended by tumbling in a closed container for 10 minutes, and subsequently masticated in a Brabender plastograph at 200° C. for 5 minutes under a nitrogen atmosphere. The chemical constituents of the various compositions are set out in Table I. The polymer compositions of Table I, set out hereafter, were subsequently evaluated by melt flow extrudate tests wherein the weight of polyolefin composition extruded, under a 268.5 gram load, during a one-minute time interval was measured after a 5 minute and a 10 minute pre-extrusion time residence period at 520° F. in accordance with ASTM D 1238–62T condition L test procedure. The extrudate temperature was also 520° F. The melt flow extrudate test data are set out in Table II. In addition, the polyolefin extrudate compositions were compression molded into small discs, one inch in diameter by $\frac{1}{16}$-inch thick and color rated against a standard color scale wherein a numerical value of 1 indicates a clean bright yellow color, increasing numerical values indicate increasing green discoloration, and a numerical value of 5 indicates green-black discoloration. The color rating data are set out in Table II.

TABLE I

| Run number | 1 | 2 | 3 | 4 | 5 | 6 | 7 |
|---|---|---|---|---|---|---|---|
| Chemical ingredients, by weight: | | | | | | | |
| Polyolefin [a] | 100 | 100 | 100 | 100 | 100 | 100 | 100 |
| Halogenated organic compound [b] | 2 | 2 | 2 | 2 | 2 | 2 | 2 |
| Metal oxide [c] | 1 | 1 | 1 | 1 | 1 | 1 | 1 |
| Phenolic stabilizer-1 [d] | 0.1 | 0.1 | 0.1 | 0.1 | 0.1 | 0.1 | 0.1 |
| Liquid metal soap mixture [e] | | 0.5 | 0.8 | | | | |
| Solid metal soap mixture [f] | | | | 0.5 | 0.8 | | |
| Do. [g] | | | | | | 0.5 | 0.8 |
| Pigment [h] | 1 | 1 | 1 | 1 | 1 | 1 | 1 |

[a] Polypropylene containing trace quantities, i.e., less than 0.02 part of 2,6-di-t-butyl-4-methylphenol per 100 parts of polypropylene.
[b] 2,2-bis[4-(2,3-dibromopropoxy)phenyl]propane.
[c] Antimony trioxide.
[d] Octadecyl[3-(3,5-di-t-butyl-4-hydroxyphenyl)]propionate.
[e] Liquid mixture of barium, cadmium, and zinc carboxylates and alkylphenolates, and a triaryl phosphite, the elemental analysis being about 6.2 wt. percent barium, about 2.1 wt. percent cadmium, about 1.3 wt. percent zinc and about 1.5 wt. percent phosphorus.
[f] Solid mixture of barium and zinc carboxylates, the elemental analysis being about 6.5 wt. percent barium, about 3.8 wt. percent zinc, also containing a polyhydric alcohol and inorganic cadmium and zinc inhibitor.
[g] Solid mixture of barium and cadmium carboxylates, the elemental analysis being about 6.0 wt. percent barium and about 4.2 wt. percent cadmium, also containing a polyhydric alcohol and inorganic calcium and zinc inhibitors.
[h] Yellow 3G (dispersion form, i.e., 25% pigment—75% polypropylene by weight).

TABLE II

| Extrudate test conditions | Melt flow extrudate values | | | | | | |
|---|---|---|---|---|---|---|---|
| Pre-extrusion temp., ° F./min.: | | | | | | | |
| 520°/5 min | 1.45 | 0.359 | 0.209 | 0.130 | 0.100 | 0.090 | 0.084 |
| 520°/10 min | 2.57 | 1.99 | 1.31 | 0.217 | 0.146 | 0.428 | 0.119 |
| | Color ratings | | | | | | |
| 520°/5 min | 2.0 | 1.5 | 1.5 | 1.5 | 1.5 | 1.0 | 1.0 |
| 520°/10 min | 3.0 | 2.0 | 2.0 | 2.0 | 1.5 | 2.0 | 1.5 |

The above melt flow data illustrate that the melt stability and color properties of flame retardant polyolefins are improved by the admixture of a solid metallic soap mixture and a flame retardant polyolefin.

Further modifications of the teachings of this invention by the use of solid metal soap mixtures to impart improved melt and color stability to flame retardant polyolefin compositions will be apparent to those skilled in the art.

That which is claimed is:

1. A composition which consists essentially of (A) a polyolefin selected from homopolymers and copolymers derived from polymerization of 1-monoolefins having from 2 to 8 carbon atoms, (B) from 0.1 to 20 parts per hundred parts of (A) of a halogenated ether selected from the group consisting of 2,3-dibromopropyl 2,4,6-tribromophenyl ether, 11,12 - dibromododecyl 2,6-dibromo-4-n-octylphenyl ether, 2,4,6-tribromophenyl benzyl ether, 3,4-dibromobutyl phenyl ether, 2,4,6-tribromophenyl cyclyohexyl ether, 2,2-bis[4-(2,3 - dibromopropoxy)phenyl]propane, and 2,2 - bis[4-(2,3-dibromopropoxy)3,5-dibromophenyl]propane, (C) from 0.1 to 2.5 parts per hundred parts of (A) of a solid metal soap mixture containing (1) a polyvalent metal soap of the formula $(RCOO)_2M$ wherein each R is a cyclic or acylic hydrocarbyl radical having from 2 to 22 carbon atoms therein and M is a polyvalent metal selected from the group consisting of barium, cadmium, lead, strontium, tin and zinc, and (2) a polyvalent metal phenolate of the formula $M(OR')_2$ wherein each R' is an aryl or alkaryl hydrocarbyl radical having from 4 to 18 carbon atoms therein and M is selected from the group consisting of barium, cadmium, lead, strontium, tin and zinc, and (D) from 0.5 to 10 parts per hundred parts of (A) of a metal oxide selected from the oxides of arsenic, antimony and bismuth.

2. A composition according to claim 1 wherein said halogenated organic compound is 2,2-bis[4-(2,3-dibromopropoxy)phenyl]propane and said metal oxide is antimony trioxide.

3. A composition according to claim 2 wherein said polyolefin is polypropylene.

4. A composition according to claim 2 wherein said metal soap mixture contains the metals barium and zinc.

5. A composition according to claim 2 wherein said metal soap mixture contains the metals cadmium and barium.

References Cited

UNITED STATES PATENTS

| | | | |
|---|---|---|---|
| 3,418,263 | 12/1968 | Hindersinn | 260—23 H |
| 3,432,461 | 3/1969 | Hill et al. | 260—45.7 R |
| 3,075,944 | 1/1963 | Wick et al. | 260—41 |
| 3,347,822 | 10/1967 | Jenkins | 260—45.75 |

FOREIGN PATENTS

| | | | |
|---|---|---|---|
| 3,214 | 7/1970 | Japan | 260—45.95 |

DONALD E. CZAJA, Primary Examiner

W. E. PARKER, Assistant Examiner

U.S. Cl. X.R.

260—23 XA, 45.75 R, 45.85 R, 45.95 G